(12) United States Patent
Otto (10) Patent No.: US 9,017,010 B2
(45) Date of Patent: *Apr. 28, 2015

(54) TURBOMACHINE GEARED ARCHITECTURE SUPPORT ASSEMBLY

(75) Inventor: John R. Otto, Middletown, CT (US)

(73) Assignee: United Technologies Corporation, Hartford, CT (US)

( * ) Notice: Subject to any disclaimer, the term of this patent is extended or adjusted under 35 U.S.C. 154(b) by 509 days.

This patent is subject to a terminal disclaimer.

(21) Appl. No.: 13/362,389

(22) Filed: Jan. 31, 2012

(65) Prior Publication Data

US 2013/0195604 A1 Aug. 1, 2013

(51) Int. Cl.
*F16H 57/08* (2006.01)
*F02C 7/20* (2006.01)
*F01D 21/04* (2006.01)
*F01D 25/16* (2006.01)
*F02C 3/107* (2006.01)
*F02C 7/36* (2006.01)

(52) U.S. Cl.
CPC ............... *F02C 7/20* (2013.01); *F05D 2250/41* (2013.01); *F01D 21/045* (2013.01); *F01D 25/162* (2013.01); *F02C 3/107* (2013.01); *F05D 2230/53* (2013.01); *F05D 2300/501* (2013.01); *F02C 7/36* (2013.01)

(58) Field of Classification Search
USPC ............... 415/122.1, 124.2; 475/331, 337
See application file for complete search history.

(56) References Cited

U.S. PATENT DOCUMENTS

| 5,433,674 | A | 7/1995 | Sheridan et al. |
| 7,011,599 | B2 | 3/2006 | Becquerelle et al. |
| 7,270,620 | B2 | 9/2007 | Tiesler et al. |
| 7,694,505 | B2 | 4/2010 | Schilling |
| 7,926,260 | B2 | 4/2011 | Sheridan et al. |
| 7,950,151 | B2 | 5/2011 | Duong et al. |
| 2010/0105516 | A1 | 4/2010 | Sheridan et al. |
| 2011/0130246 | A1 | 6/2011 | McCune et al. |
| 2011/0286836 | A1 | 11/2011 | Davis |

FOREIGN PATENT DOCUMENTS

| EP | 1013894 B1 | 6/2000 |
| EP | 2011987 A2 | 1/2009 |

OTHER PUBLICATIONS

Jane's Aero Engines, edited by Bill Gunston, Issue 7, Mar. 2000.
International Search Report and Written Opinion for International Application No. PCT/US2013/021897 completed on Sep. 11, 2013.
Munyon et al; The Application of Flexible Couplings for Turbomachinery; Kop-Flex Power Transmission Products; 1989; pp. 1-25.
International Preliminary Report on Patentability for PCT Application No. PCT/US2013/021897 mailed Aug. 14, 2014.

*Primary Examiner* — Richard Edgar
(74) *Attorney, Agent, or Firm* — Carlson, Gaskey & Olds, P.C.

(57) ABSTRACT

An example turbomachine geared architecture support assembly includes a subpart having a more compliant portion and a less compliant portion. The less compliant portion includes a stop that limits axial movement of a geared architecture within a turbomachine.

20 Claims, 7 Drawing Sheets

TURBOMACHINE GEARED ARCHITECTURE SUPPORT ASSEMBLY

BACKGROUND

This disclosure relates to limiting movement of a geared architecture within a turbomachine during an extreme event.

Turbomachines, such as gas turbine engines, typically include a fan section, a turbine section, a compressor section, and a combustor section. Turbomachines may employ a geared architecture connecting the fan section and the turbine section.

Support structures are used to hold the geared architecture within the turbomachine. The support structures may be relatively compliant to accommodate some movement of the geared architecture relative to other portions of the turbomachine. Extreme engine events such as fan blade loss or failure of fan shaft bearing supports may encourage significant axial movement of the geared architecture and the fan, relative to other portions of the turbomachine. These movements are undesirable as is known. The relatively compliant support structures are not able to hold the geared architecture during extreme engine events.

SUMMARY

A turbomachine geared architecture support assembly according to an exemplary aspect of the present disclosure includes, among other things, a support having a more compliant portion and a less compliant portion. The less compliant portion includes a stop that limits axial movement of a geared architecture within a turbomachine.

In a further non-limiting embodiment of the foregoing turbomachine geared architecture support assembly, the assembly may include a more compliant portion and a less compliant portion that are portions of a single, monolithic support.

In a further non-limiting embodiment of any of the foregoing turbomachine geared architecture support assemblies, the assembly may include a stop that comprises a plurality of tangs each extending radially past a portion of a support member that is directly connected to the geared architecture.

In a further non-limiting embodiment of any of the foregoing turbomachine geared architecture support assemblies, the assembly may include a plurality of tangs circumferentially distributed about the axis.

In a further non-limiting embodiment of any of the foregoing turbomachine geared architecture support assemblies, the assembly may include a support member as a rigid member.

In a further non-limiting embodiment of any of the foregoing turbomachine geared architecture support assemblies, the assembly may include a less compliant portion that is an annulus.

In a further non-limiting embodiment of any of the foregoing turbomachine geared architecture support assemblies, the assembly may include a less compliant portion that accommodates some movement of the geared architecture during operation of the turbomachine, the movement relative to other portions of the turbomachine.

In a further non-limiting embodiment of any of the foregoing turbomachine geared architecture support assemblies, the assembly may include a more compliant portion that couples the geared architecture to a case structure of the turbomachine.

In a further non-limiting embodiment of any of the foregoing turbomachine geared architecture support assemblies, the assembly may include a less compliant portion that is coupled directly to the case structure.

A turbomachine geared architecture support assembly according to another exemplary aspect of the present disclosure includes, among other things, a less compliant portion secured relative to a turbomachine engine case, and a more compliant portion secured relative to the turbomachine engine case and a geared architecture. The less compliant portion includes a stop that limits axial movement of the geared architecture relative to the engine case.

In a further non-limiting embodiment of any of the foregoing turbomachine geared architecture support assemblies, the assembly may include a less compliant portion that includes separate sections distributed circumferentially about an axis of the turbomachine.

In a further non-limiting embodiment of any of the foregoing turbomachine geared architecture support assemblies, each of the separate sections may include radially extending portions that are configured to extend radially past a member that moves with the geared architecture.

In a further non-limiting embodiment of any of the foregoing turbomachine geared architecture support assemblies, the assembly may include radially extending portions that extend from axially extending portions of the separate sections.

In a further non-limiting embodiment of any of the foregoing turbomachine geared architecture support assemblies, the assembly may include axially extending portions that extend further circumferentially than the radially extending portions.

In a further non-limiting embodiment of any of the foregoing turbomachine geared architecture support assemblies, the more compliant portion may be an annulus.

In a further non-limiting embodiment of any of the foregoing turbomachine geared architecture support assemblies, the assembly may include a more compliant portion secured directly to a geared architecture support member.

In a further non-limiting embodiment of any of the foregoing turbomachine geared architecture support assemblies, the assembly may include a less compliant portion and a more compliant portion axially aft the geared architecture relative to a direction of flow through the turbomachine.

A method of supporting a geared architecture in a turbomachine according to another exemplary aspect of the present disclosure includes, among other things, using a relatively compliant support arm to permit movement of a geared architecture relative to other portions of a turbomachine, and using a relatively rigid support arm to limit movement of the geared architecture in an axial direction.

In a further non-limiting embodiment of the foregoing method of supporting a geared architecture in a turbomachine, the method may include the relatively compliant support arm and the relatively rigid support arm axially aft the turbomachine relative a direction of flow through the turbomachine.

In a further non-limiting embodiment of the foregoing method of supporting a geared architecture in a turbomachine, the method may include a compliant support arm and a rigid support arm that are portions of the same monolithic support assembly.

In a further non-limiting embodiment of any of the foregoing methods of supporting a geared architecture in a turbomachine, the method may include a relatively rigid support arm that limits movement during an extreme event.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
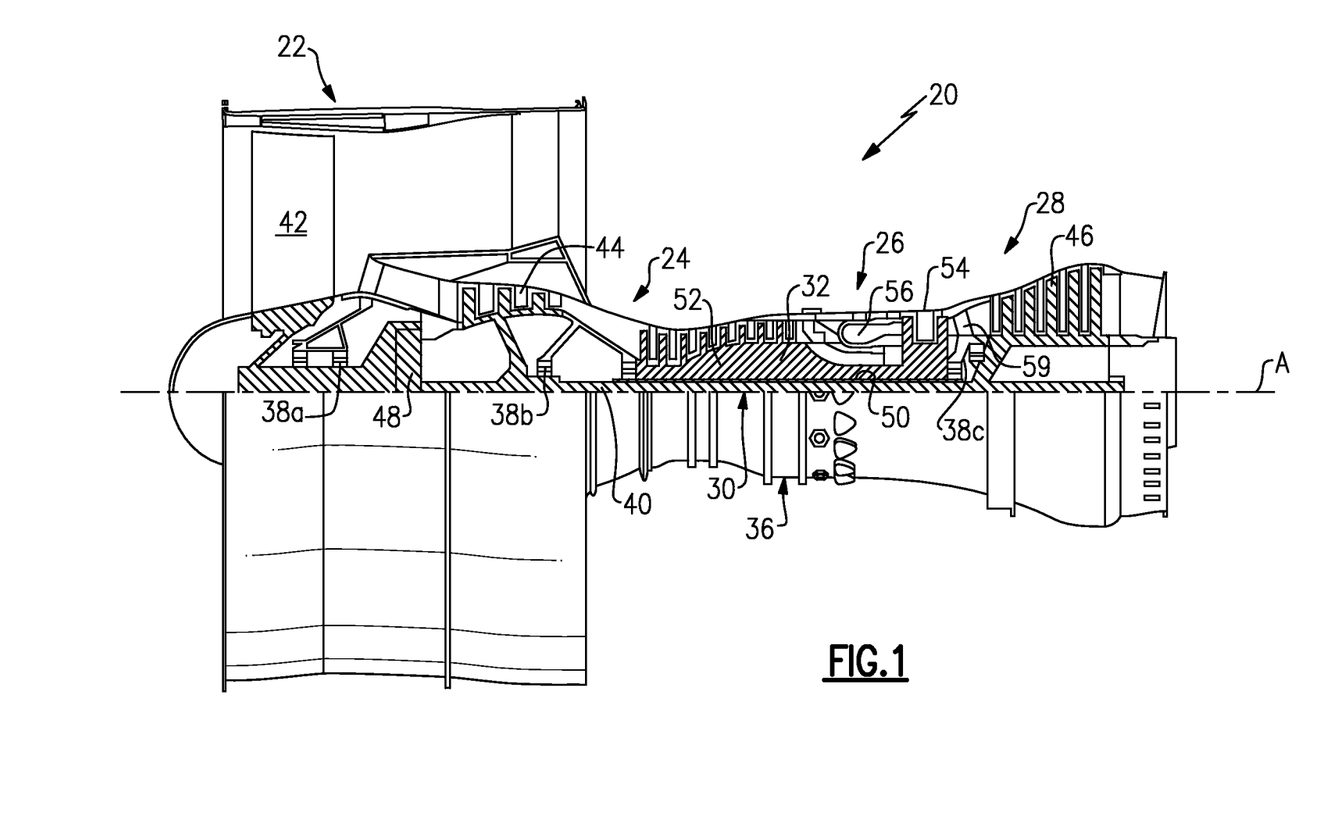
FIG. 1 shows a partial section view of an example turbomachine.

FIG. 1 schematically illustrates an example turbomachine, which is a gas turbine engine 20 in this example. The gas turbine engine 20 is a two-spool turbofan gas turbine engine that generally includes a fan section 22, a compressor section 24, a combustion section 26, and a turbine section 28. Other examples may include an augmentor section (not shown) among other systems or features.

Although depicted as a two-spool turbofan gas turbine engine in the disclosed non-limiting embodiment, it should be understood that the concepts described herein are not limited to use with turbofans. That is, the teachings may be applied to other types of turbomachines and turbine engines including three-spool architectures.

In the example engine 20, the fan section 22 drives air along a bypass flowpath while the compressor section 24 drives air along a core flowpath. Compressed air from the compressor section 24 communicates through the combustion section 26. The products of combustion expand through the turbine section 28.

The example engine 20 generally includes a low-speed spool 30 and a high-speed spool 32 mounted for rotation about an engine central longitudinal axis A relative to an engine static structure 36. The low-speed spool 30 and the high-speed spool 32 are rotatably supported by several bearing systems 38a-38c. It should be understood that various bearing systems 38a-38c at various locations may alternatively, or additionally, be provided.

The low-speed spool 30 generally includes an inner shaft 40 that interconnects a fan 42, a low-pressure compressor 44, and a low-pressure turbine 46. The inner shaft 40 is connected to the fan 42 through a geared architecture 48 to drive the fan 42 at a lower speed than the low-speed spool 30.

The high-speed spool 32 includes an outer shaft 50 that interconnects a high-pressure compressor 52 and high-pressure turbine 54.

The combustion section 26 includes a circumferentially distributed array of combustors 56 generally arranged axially between the high-pressure compressor 52 and the high-pressure turbine 54.

A mid-turbine frame 58 of the engine static structure 36 is generally arranged axially between the high-pressure turbine 54 and the low-pressure turbine 46. The mid-turbine frame 58 supports bearing systems 38a-38c in the turbine section 28.

The inner shaft 40 and the outer shaft 50 are concentric and rotate via at least the bearing systems 38b-38c about the engine central longitudinal axis A, which is collinear with the longitudinal axes of the inner shaft 40 and the outer shaft 50.

In the example engine 20, the core airflow is compressed by the low-pressure compressor 44 then the high-pressure compressor 52, mixed and burned with fuel in the combustors 56, then expanded over the high-pressure turbine 54 and low-pressure turbine 46. The mid-turbine frame 58 includes airfoils 60 within the path of the core airflow. The high-pressure turbine 54 and the low-pressure turbine 46 rotatably drive the respective high-speed spool 32 and low-speed spool 30 in response to the expansion.

In some non-limiting examples, the engine 20 is a high-bypass geared aircraft engine. In a further example, the engine 20 bypass ratio is greater than about six (6:1). The geared architecture 48 of the example engine 20 includes an epicyclic gear train, such as a planetary gear system or other gear system. The example epicyclic gear train has a gear reduction ratio of greater than about 2.3 (2.3:1).

The low-pressure turbine 46 pressure ratio is pressure measured prior to inlet of low-pressure turbine 46 as related to the pressure at the outlet of the low-pressure turbine 46 prior to an exhaust nozzle of the engine 20. In one non-limiting embodiment, the bypass ratio of the engine 20 is greater than about ten (10:1), the fan diameter is significantly larger than that of the low pressure compressor 44, and the low-pressure turbine 46 has a pressure ratio that is greater than about 5 (5:1). The geared architecture 48 of this embodiment is an epicyclic gear train with a gear reduction ratio of greater than about 2 (2.5:1). It should be understood, however, that the above parameters are only exemplary of one embodiment of a geared architecture engine and that the present disclosure is applicable to other gas turbine engines including direct drive turbofans.

In this embodiment of the example engine 20, a significant amount of thrust is provided by the bypass flow B due to the high bypass ratio. The fan section 22 of the engine 20 is designed for a particular flight condition—typically cruise at about 0.8 Mach and about 35,000 feet. This flight condition, with the engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example engine 20 is less than 1.45.

Low Corrected Fan Tip Speed is the actual fan tip speed divided by an industry standard temperature correction of "T"/$518.7^{0.5}$. T represents the ambient temperature in degrees Rankine. The Low Corrected Fan Tip Speed according to one non-limiting embodiment of the example engine 20 is less than about 1150 fps (351 m/s).

During operation, the engine 20 may experience extreme events such as a fan blade loss or a failure of a fan shaft bearing support. In such events, the fan 42 may undesirably tend to move axially forward relative to the other portions of the engine 20, such that the fan 42 and associated components become disengaged from the engine 20.

In this example, the bearings 38a are thrust bearings. During an extreme event, the thrust bearings are one feature the example engine 20 utilizes to limit the tendency for the fan 42 to move axially forward the remaining portions of the engine 20. If the bearings 38a ineffectively limit movement of the fan 42, the fan 42 may undesirably cause the geared architecture 48 and other components from the engine 20 to disengage from the engine 20.

Figure 2A:
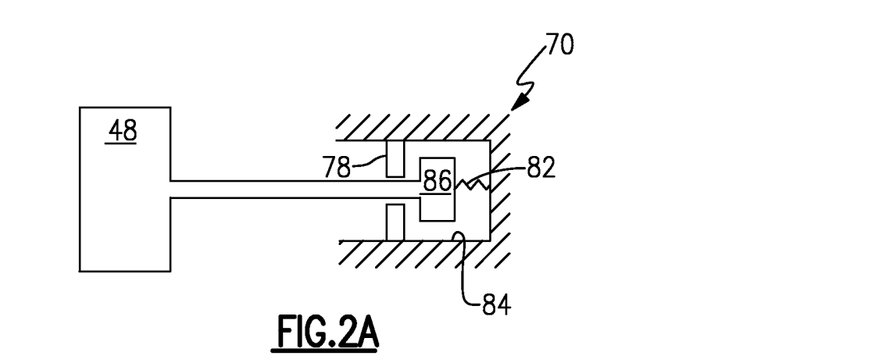
FIG. 2A shows a highly schematic view of an example geared architecture support assembly of the FIG. 1 turbomachine during normal operation.
Figure 2B:
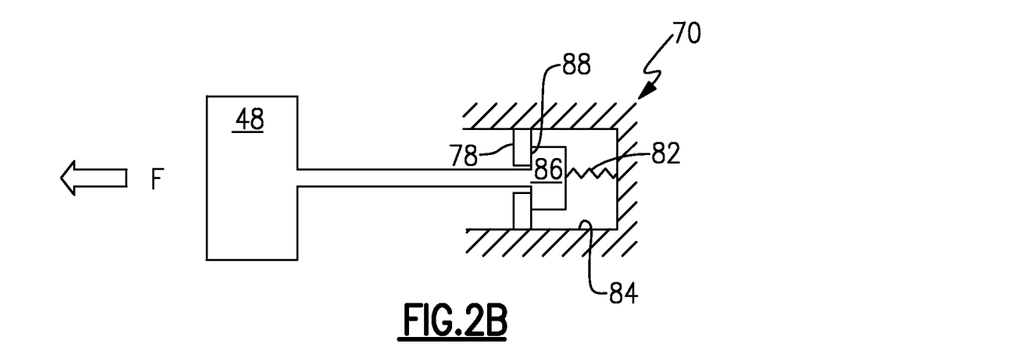
FIG. 2B shows a highly schematic view of the FIG. 2A geared architecture support during an extreme event.

Referring to FIGS. 2A and 2B with continuing reference to FIG. 1, the example engine 20 includes other features that limit movement of the fan 42 during an extreme event, particularly if the bearings 38a are ineffective. For example, the example engine 20 includes a geared architecture support assembly 70 that limits forward movement of the fan 42 and the geared architecture 48 during an extreme event.

The example support assembly 70 includes at least a first arm 78 and a second arm 82. The first arm 78 and the second arm 82 are directly connected to the engine case structures 84, which function as a mechanical ground.

The example first arm 78 is less compliant than the example second arm 82. Thus, the support assembly 70 has a less compliant portion and a more compliant portion. Notably, the first arm 78 and the second arm 82 are both axially aft the geared architecture 48 relative to a direction of flow through the engine 20.

During normal operation of the engine 20, one end of the second arm 82 of the support assembly 70 connects to a rigid member 86 that is directly connected to the geared architecture 48. The second arm 82 supports the geared architecture 48 through the rigid member 86.

The second arm 82 is relatively compliant and thus permits some movements of the geared architecture 48 relative to other portions of the engine 20. Some movement of the geared architecture 48 relative to other portions of the engine 20 is necessary to accommodate, for example, assembly tolerances and flexing of the engine 20 during normal operation.

During an extreme event, such as a blade loss, the geared architecture 48 may experience an extreme load in the direction F due to the fan 42 rotating and attempting to move axially forward relative to other portions of the engine 20. The loading is especially likely if the bearings 38a have failed.

In such an event, extreme movements of the geared architecture 48 are limited by the first arm 78. In this example, the loading in the direction F causes the rigid member 86 to directly contact the first arm 78 at area 88. This contact blocks movement of the geared architecture 48 axially out of the engine 20. Since the geared architecture 48 is connected to the fan 42, limiting movement of the geared architecture 48 may prevent the fan 42 from moving axially forward the remaining portions of the engine 20.

Referring now to FIGS. 3-10, another example support assembly 100 suitable for use within the engine 10, includes a first arm 104 and a second arm 108. The second arm 108 is more compliant than the first arm 104. In this example, the first arm 104 and the second arm 108 are portions of the same structure. Further, the first arm 104 and the second arm 108 are cast together to form a single monolithic structure. In other examples, the first arm 104 and the second arm 108 are welded together.

The example support assembly 100 is grounded to the engine case 84 (FIGS. 2A and 2B) with splines. Other examples may ground the support assembly in other ways.

Figure 5:
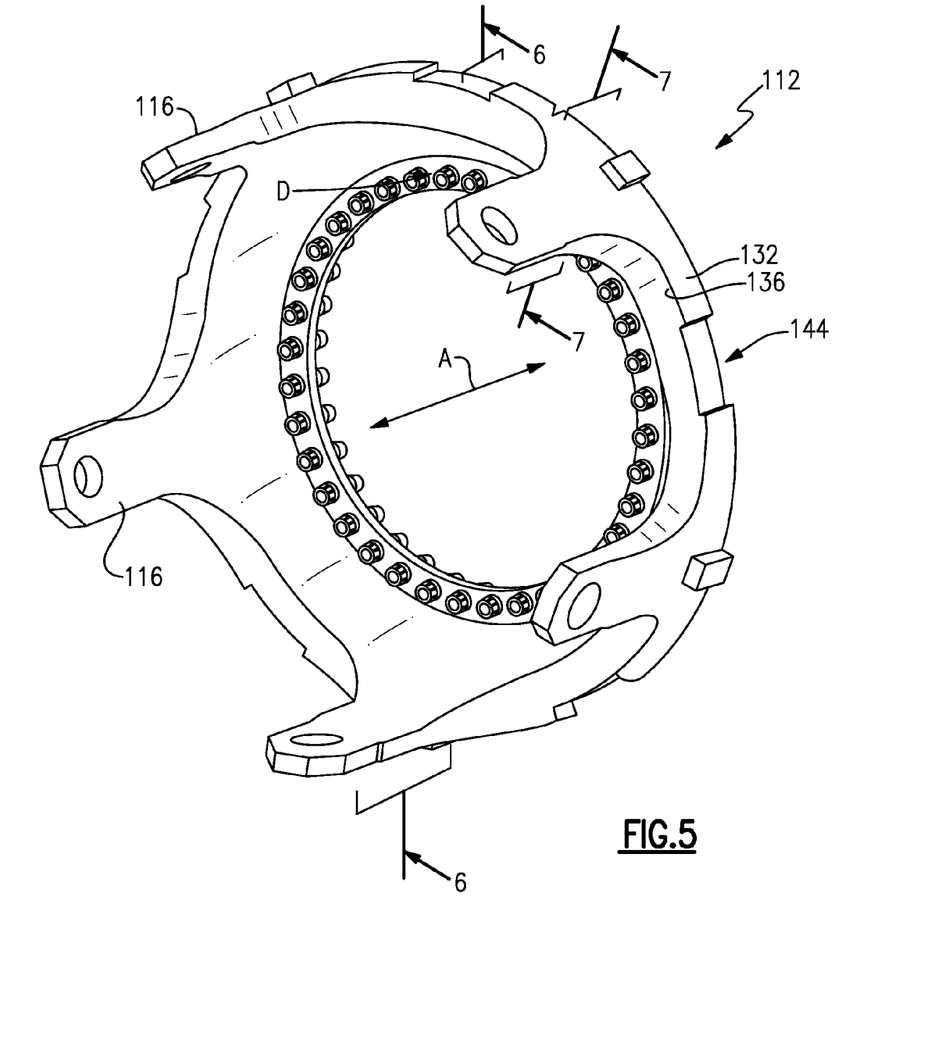
FIG. 5 shows a perspective view of a support ring suitably for use with the FIG. 3 support assembly.
Figure 6:
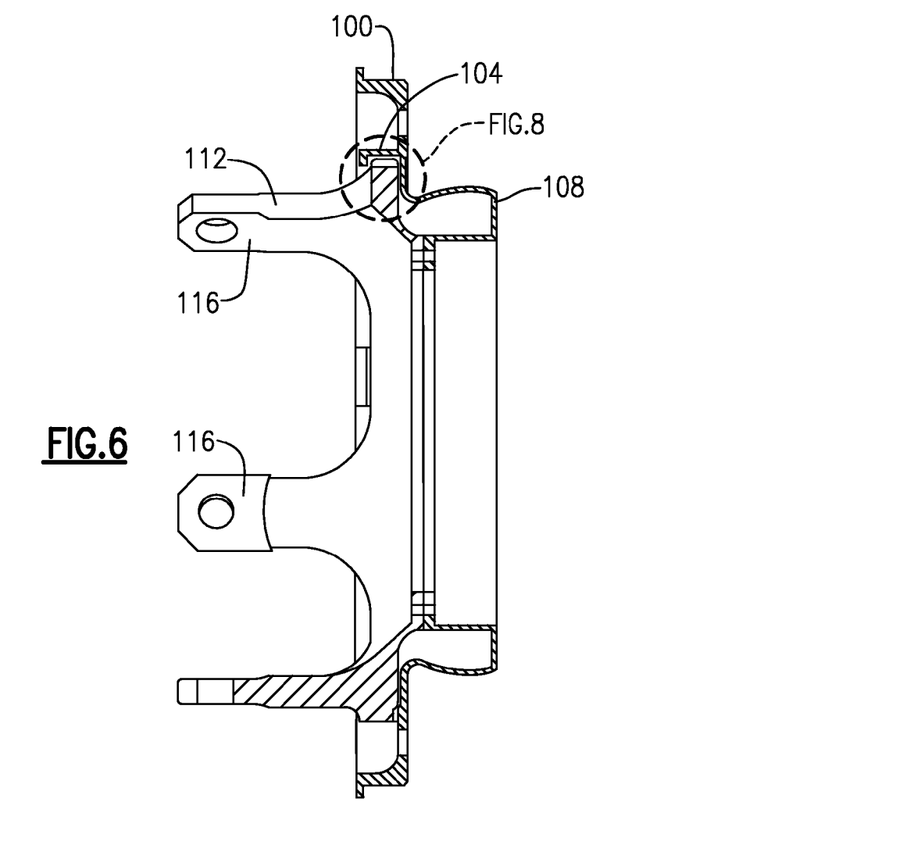
FIG. 6 shows a section view of the FIG. 3 support assembly together with the FIG. 5 support ring at line 6-6 in FIGS. 4 and 5.
Figure 7:
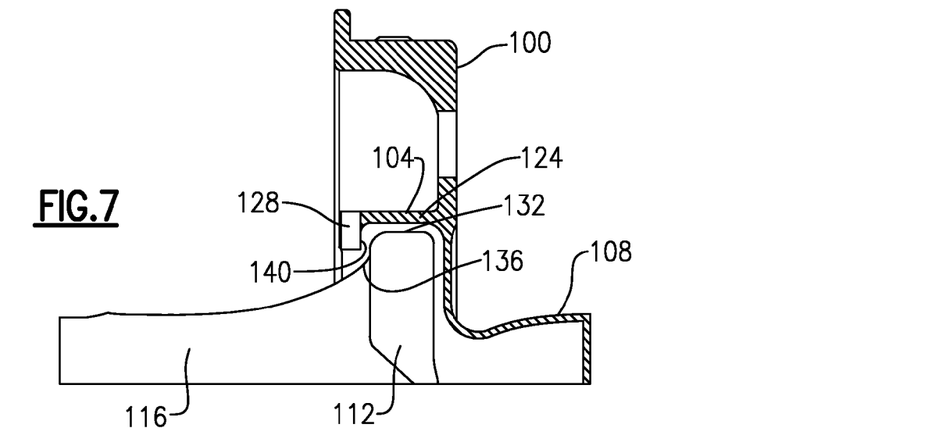
FIG. 7 shows a section view of the FIG. 3 support assembly together with the FIG. 5 support ring at line 7-7 in FIGS. 4 and 5.
Figure 8:
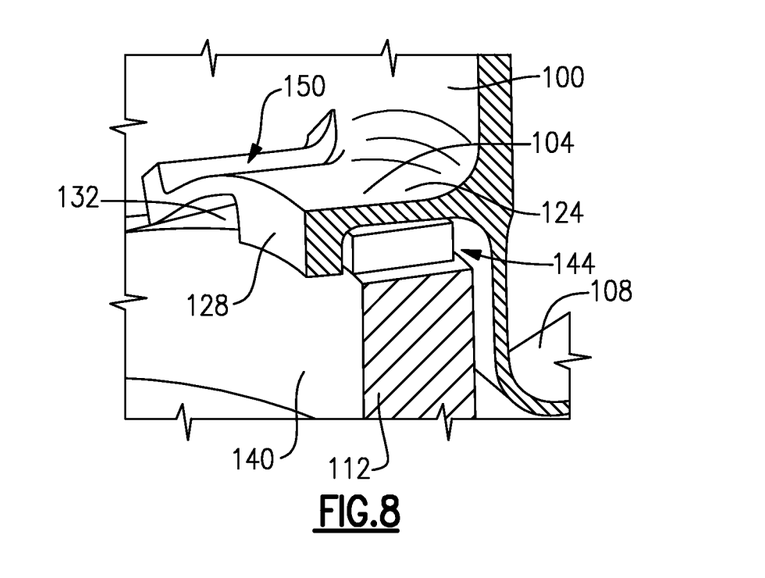
FIG. 8 shows a perspective view of area 8 in FIG. 6.

A torque frame 112 is secured directed to the second arm 108. The torque frame 112 is a type of support member. The example torque frame 112 includes five flanges 116 distributed circumferentially about the torque frame 112. The flanges 116 directly connect to the geared architecture 48. The torque frame 112 fixes gears of the geared architecture 48 against rotation.

The example torque frame 112 is configured to move with the geared architecture 48. The second arm 108, which is relatively compliant, allows movements of the geared architecture 48 (and the torque frame 112) during normal operation of the engine 20.

Figure 3:
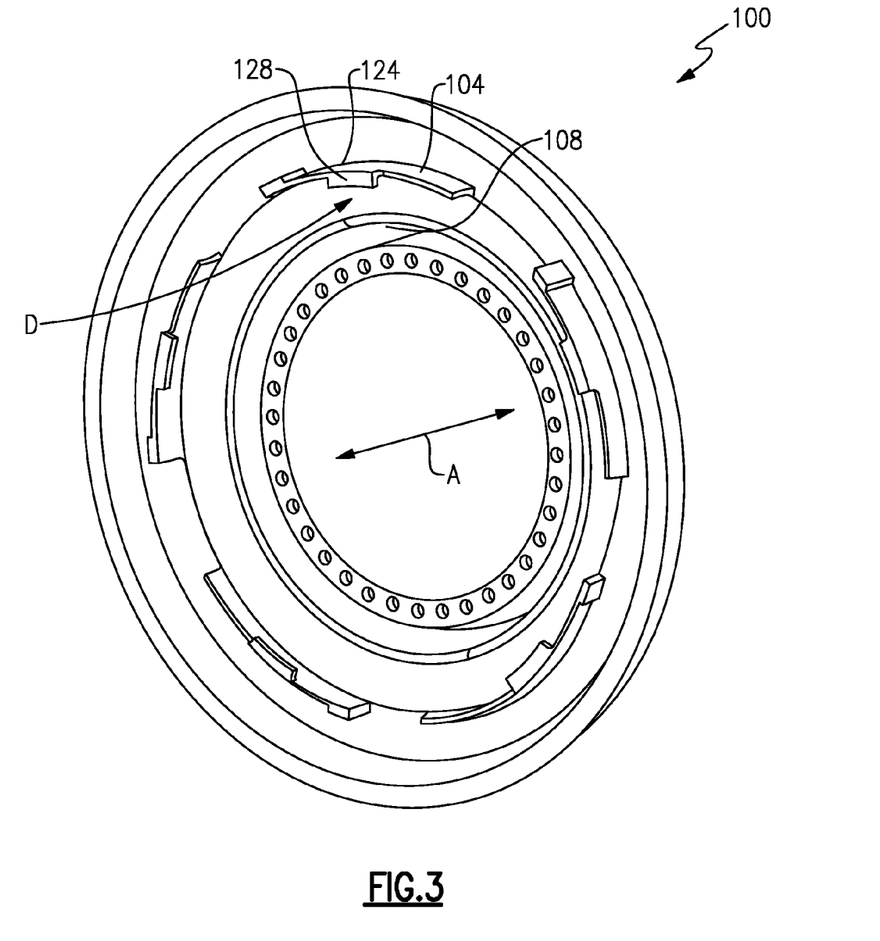
FIG. 3 shows a perspective view of another example geared architecture support assembly suitable for use within the FIG. 1 turbomachine.
Figure 4:
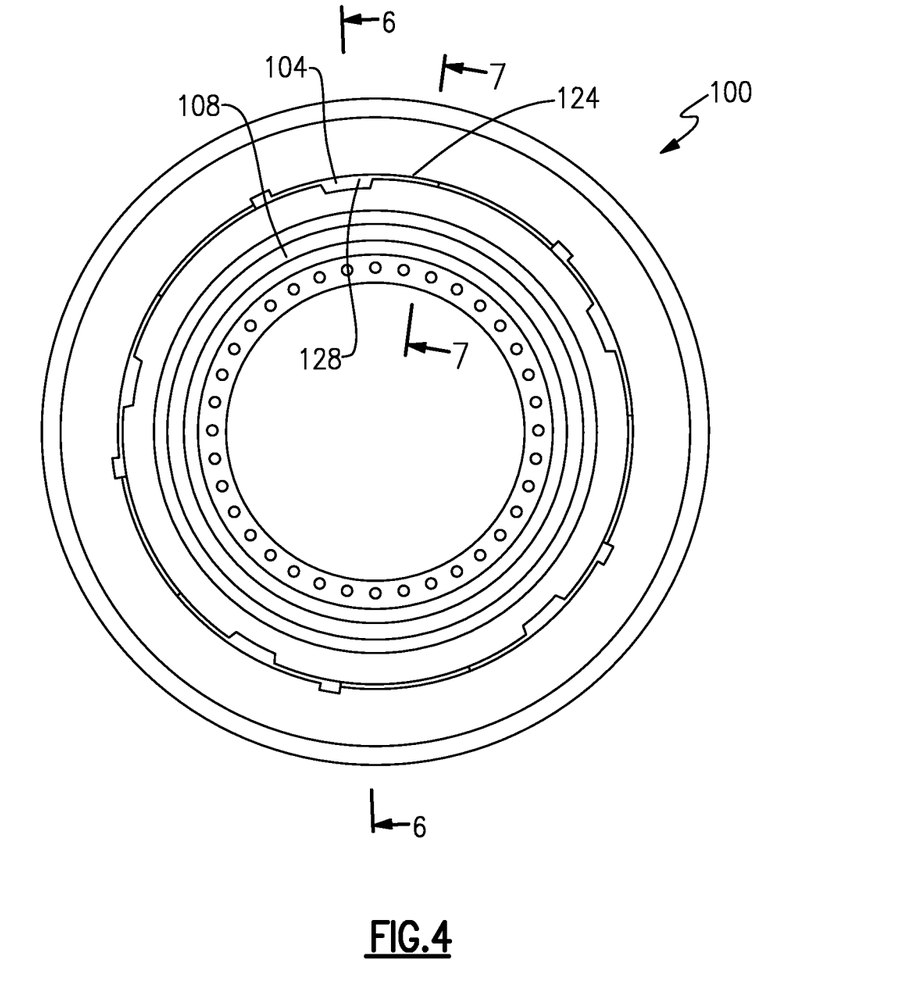
FIG. 4 shows an axially facing view of the FIG. 3 support assembly.

In this example, the first arm 104 includes five separate sections distributed circumferentially about the axis A of the engine 20. The second arm 108, by contrast is an annulus and extends circumferentially around the axis A. Although the first arm 104 is described, in this example, as including separate sections. The entire first arm 104 may be an annulus in another example. In still other examples, portions of the first arm 104 are an annulus, and other portions are sectioned.

Each first arm 104 includes an axially extending portion 124 and a radially extending portion 128. In this example, the axially extending portion 124 of each first arm 104 extends circumferentially further than the radially extending portion 128. Each of the radially extending portions 128 is placed near a circumferential center of the respective first arm 104. The radially extending portions 128 are considered tangs in this example.

Notably, the radially extending portions 128 extend radially past an outer perimeter 132 of the torque frame 112. Thus, during an extreme event where the torque frame 112 is pulled forward, a forward facing surface 136 of the torque frame 112 contacts an aft facing surface 140 of each of the radially extending portions 128. Contact between these surfaces 136 and 140, blocks further axially forward movement of the torque frame 112, and thus further axially forward movement of the geared architecture 48.

Figure 9:
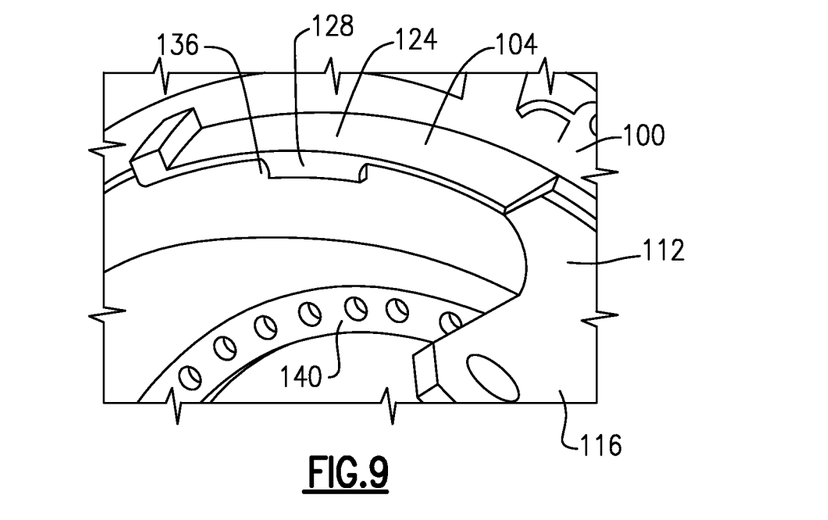
FIG. 9 shows a perspective view of a portion the FIG. 3 support assembly together with the FIG. 5 support ring in the direction D in FIGS. 3 and 5.

The torque frame 112 includes slots 144 that receive the radially extending portions 128 during assembly. The slots 144 allow the radially extending portion 128 to move axially during assembly into a position where the surface 140 is forward the surface 136. After moving axially into the position, the torque frame 112 is rotated relative to the support structure 100 so that the surface 140 is at least partially circumferentially aligned with the surface 136.

As can be appreciated, the axially extending portions 124 limit radial movements of the torque frame 112 and thus radial movement of the geared architecture 48.

In addition to limiting radial and forward axial movement of the geared architecture 48, the example support structure 100 includes a tab 150 that limits circumferential movement of the circumferential movement of the geared architecture 48. The geared architecture 48 includes a frame member (not shown) that connects directly to the geared architecture 48 and contacts the tab 150 to limit circumferential moment of the geared architecture 48.

Features of the disclosed examples include a support structure that permits some movement of a geared architecture relative to other portions of an engine during normal operation of the engine, but limits movements during extreme events, particularly axially forward movements of the geared architecture.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

I claim:

1. A turbomachine geared architecture support assembly, comprising:
 a support having a more compliant portion and a less compliant portion, wherein the less compliant portion includes a stop that limits axial movement of a geared architecture within a turbomachine, the stop configured to be spaced from a rigid member during normal operation of a turbomachine that includes the geared architecture, the stop further configured to contact the rigid member during abnormal operation of the turbomachine to limit the axial movement.

2. The turbomachine geared architecture support assembly of claim 1, wherein the more compliant portion and the less compliant portions are portions of a single, monolithic support.

3. The turbomachine geared architecture support assembly of claim 1, wherein the stop comprises a plurality of tangs each extending radially past a portion of a support member that is directly connected to the geared architecture.

4. The turbomachine geared architecture support assembly of claim 3, wherein the plurality of tangs are circumferentially distributed about the axis.

5. The turbomachine geared architecture support assembly of claim 1, wherein the less compliant portion is an annulus.

6. The turbomachine geared architecture support assembly of claim 1, wherein the more compliant portion accommodates some movement of the geared architecture during operation of the turbomachine, the movement relative to other portions of the turbomachine.

7. The turbomachine geared architecture support assembly of claim 1, wherein the less compliant portion couples the geared architecture to a case structure of the turbomachine.

8. The turbomachine geared architecture support assembly of claim 1, wherein the less compliant portion is coupled directly to the case structure.

9. A turbomachine geared architecture support assembly, comprising:
 a less compliant portion secured relative to a turbomachine engine case; and
 a more compliant portion secured relative to the turbomachine engine case and a geared architecture; wherein the less compliant portion includes a stop that limits axial movement of the geared architecture relative to the engine case, wherein the less compliant portion and the more compliant portion are portions of a single, monolithic support.

10. The turbomachine geared architecture support assembly of claim 9, wherein the less compliant portion includes separate sections distributed circumferentially about an axis of the turbomachine.

11. The turbomachine geared architecture support assembly of claim 10, wherein each of the separate sections includes radially extending portions that are configured to extend radially past a member that moves with the geared architecture.

12. The turbomachine geared architecture support assembly of claim 11, wherein the radially extending portions extend from axially extending portions of the separate sections.

13. The turbomachine geared architecture support assembly of claim 11, wherein axially extending portions extend further circumferentially than the radially extending portions.

14. The turbomachine geared architecture support assembly of claim 9, wherein the more compliant portion is an annulus.

15. The turbomachine geared architecture support assembly of claim 9, wherein the more compliant portion is secured directly to a geared architecture support member.

16. The turbomachine geared architecture support assembly of claim 9, wherein the less compliant portion and the more compliant portion are axially aft the geared architecture relative to a direction of flow through the turbomachine.

17. A method of supporting a geared architecture in a turbomachine, comprising:
 using a relatively compliant support arm to permit axial movement of a geared architecture relative to other portions of a turbomachine; and
 using a relatively rigid support arm to limit movement of the geared architecture in an axial direction.

18. The method of claim 17, wherein the relatively compliant support arm and the relatively rigid support arm are axially aft the turbomachine relative a direction of flow through the turbomachine.

19. The method of claim 17, wherein the compliant support arm and the rigid support arm are portions of the same monolithic support assembly.

20. The method of claim 17, wherein the relatively rigid support arm limits movement during an extreme event.

* * * * *